United States Patent [19]
Gruber et al.

[11] Patent Number: 5,325,580
[45] Date of Patent: Jul. 5, 1994

[54] PROCESS FOR THE PRODUCTION OF ENAMELLED WORKPIECES

[75] Inventors: Hermann Gruber, Leverkusen; Eberhard Arning, Kaarst, both of Fed. Rep. of Germany; Hans Hoffmann, Brügge, Belgium; Alain Viquesnel, Iouy en Iosas, France; Paul Zybell, Zanica, Italy; Dieter Margotte; Keith Foster, both of Krefeld, Fed. Rep. of Germany

[73] Assignees: Bayer Aktiengesellschaft, Leverkusen, Fed. Rep. of Germany; Miles Inc., Pittsburgh, Pa.

[21] Appl. No.: 13,958

[22] Filed: Feb. 5, 1993

[30] Foreign Application Priority Data

Feb. 18, 1992 [IT] Italy .................. MI92 /000350

[51] Int. Cl.$^5$ .................. B23P 17/04; B21D 35/00
[52] U.S. Cl. .................. 29/527.4; 29/17.2; 29/DIG. 14; 427/330
[58] Field of Search .......... 29/527.2, 527.4, DIG. 14, 29/17.2, 17.3, 527.1; 427/215, 216, 330, 376.2, 386, 385.5; 428/567, 568

[56] References Cited

U.S. PATENT DOCUMENTS

| | | |
|---|---|---|
| 3,110,413 | 11/1963 | McKay et al. .................. 29/527.2 X |
| 3,154,426 | 10/1964 | Kohnken .................. 29/527.2 X |
| 3,867,157 | 2/1975 | Peeling, Jr. .................. 427/216 X |
| 3,906,125 | 9/1975 | Uher .................. 427/330 |
| 4,442,145 | 4/1984 | Probst et al. .................. 427/385.5 |
| 4,460,630 | 7/1984 | Nishino et al. .................. 427/376.2 X |
| 4,542,048 | 9/1985 | Nickola et al. .................. 427/386 X |
| 4,933,223 | 6/1990 | Frauenfeld et al. .................. 427/215 X |

OTHER PUBLICATIONS

ISO 2431:1993(E) International Standard, Paints and Varnishes, 4th Ed. Feb. 1993.
Short Description of Bayer-method in Pöschmann: Email U. Emailliertechnik p. 148, FIG. 9–12 (no date).
Patent Abstracts of Japan, 13:283 (Jun. 28, 1989).
Patent Abstracts of Japan, 5:089 (Jun. 10, 1981).
Derwent Database, AN 78-39257A (Apr. 20, 1978).

*Primary Examiner*—Peter Dungba Vo
*Attorney, Agent, or Firm*—Connolly & Hutz

[57] ABSTRACT

A process is disclosed for the production of metal sheets enamelled with two layers, wherein the sheet is coated, before shaping, with a polymer suspension. The sheet is then dried and shaped, and optionally is coated with an enamel frit. The sheet is then fired at a temperature of 560 to 850 degrees C. The binder in the polymer suspension is preferably a material which burns completely at melting and stoving temperature.

14 Claims, No Drawings

PROCESS FOR THE PRODUCTION OF ENAMELLED WORKPIECES

FIELD OF THE INVENTION

This invention relates to an improved process for the production of enamelled workpieces.

BACKGROUND OF THE INVENTION

It is generally known that steel sheets are normally enamelled as follows:
a) cutting to size of the generally oiled and, in special cases also dried sheets
b) shaping of the sheets, optionally after application of drawing aids, into workplaces, for example by deep drawing
c) chemical pretreatment of the workpieces, for example by degreasing, pickling, nickel plating and/or passivation
d) application of the enamel frit by known methods, for example by electrostatic powder coating (in which case step c) may be partly omitted) or slip coating
e) drying (in the case of wet coating)
f) firing.

In one particular enamelling technique, the enamel is applied to thin steel strip (0.3–0.4 mm) first in a double-sided base layer (drying/firing) and then in a single- or double-sided top layer (drying/firing). The enamelled "semifinished product" may then be correspondingly cut to size and bonded to form sandwich elements (support materials: gypsum boards, fiber boards, PU foams, etc.). However, the enamelled strip cannot be sharply bent or even deep-drawn on account of the glasslike nature of its surface. So far as the pretreatment and uniformity of coating of unshaped steel sheets are concerned, major advantages are obtained over the conventional technique of treating previously shaped sheets. However, workpieces can only be shaped to a limited extent, if at all, after coating with enamel in view of the brittleness of the enamel layer.

U.S. Pat. No. 3,154,426 describes a process for enamelling metal objects. An enamel layer is first applied to the pretreated metal and dried, after which an organic polymer is applied and subsequently fired. The disadvantage of this process is that, in the case of light-colored enamelling, the metal sheets have to be intensively pickled and nickel-plated to obtain good adhesion. Although this can be done continuously on the coil itself either chemically or electrolytically, it does require expensive equipment.

In order to avoid the complicated procedure involved in the pretreated process described in U.S. Pat. No. 3,154,426, U.S. patent Ser. No. 3,906,125 proposes pretreating the steel sheets by various annealing processes. However, this procedure is also very complicated and expensive and, accordingly, has never been adopted in practice.

SUMMARY OF THE INVENTION

The problem addressed by the present invention was to provide an improved process for enamelling workpieces which would enable enamelling to be carried out optionally without pretreatment of the metal and which, at the same time, would enable shaping of the metal sheet to be carried out without any disadvantages.

This problem has been solved by the process according to the invention.

The present invention relates to a process for the production of workpieces of metal sheet enamelled with two layers, characterized in that, before shaping, the sheet is coated with at least one enamel polymer suspension and then dried, after which the sheet thus treated is shaped and the sheet thus shaped is optionally coated with another enamel frit and the workpiece thus obtained is fired at temperatures of 560° to 850° C., depending on the metal used.

DESCRIPTION OF THE PREFERRED EMBODIMENTS

The process is preferably carried out by successive application of two enamel polymer suspensions to the sheet before shaping.

In one preferred variant of the process according to the invention, one enamel polymer suspension is applied before shaping of the sheet and another enamel is applied after shaping (for example in the form of an enamel slip or powder).

A mixture of binder, solvent and suspension aids and, optionally, other additives is preferably used as the polymer in the process according to the invention.

Hydroxyfunctional, nitrogen- and halogen-free polymers and/or polycondensates which burn completely at the stoving/melting temperatures are preferably used as the binder.

The hydroxyl group content in the binder is preferably between 0.5 and 10%.

Polyhydroxypolyacrylates preferably having a hydroxyl group content of 0.5 to 10% by weight are particularly suitable.

Mixtures of polyhydroxypolyacrylates with polyhydroxypolyesters preferably having a hydroxyl group content of 0.5 to 10% by weight are particularly preferred. The mixtures are prepared in particular in a ratio by weight of polyhydroxypolyacrylates to polyhydroxypolyesters of 9:1 to 1:9 and preferably 9:1 to 6:4.

The solution viscosities of 50% by weight solutions of the polyacrylate resins in xylene:methoxypropyl acetate (ratio by weight 1:1) are generally between 2,000 and 30,000 mPas and preferably between 3,000 and 10,000 mPas at 23° C.

Mixtures of acid-functional and epoxy-functional, nitrogen- and halogen-free polymers that completely burn at the stoving/melting temperatures are most particularly preferred as binder. These polymers crosslink during the initial drying of the enamel polymer suspension by the reaction of the acid groups of one polymer with the epoxy groups of the other, preferably at elevated temperature (>50° C.).

The content of acid groups in the polymer is preferably between 0.5 and 30% by weight, and the content of epoxy groups in the polymer is preferably between 0.5 and 30% by weight.

Polyacrylic polymers with more than one acid- or epoxy-group per average molecular unit and which preferably have an acid- or epoxy-content of 0.5 to 30% by weight are preferred.

Mixtures of acid-containing polyacrylic polymers, which have an acid group content from 1 to 20% by weight, with epoxy-containing polyacrylic polymers, which have an epoxy group content from 1 to 15% by weight are particularly preferred as binder. These mixtures are prepared so that the stoichiometric ratio between acid and epoxy groups is between 99:1 and 1:99, preferably from 9:1 to 1:9, particularly preferably from 1:2 to 2:1.

The solution viscosity of 50 weight % solutions of the polyacrylate polymers in a high-boiling, aromatic hydrocarbon mixture such as Solvesso 150 ® of Exxon Chemical International, Inc. or cyclohexanone, or mixtures of these two solvents is in the case of the acid-functional polyacrylic polymer in general at 23° C. between 2,000 and 30,000 mPa.sec, preferably between 3,000 and 10,000 mPa.sec. In the case of the epoxy-group containing polyacrylic polymer, the solution viscosity of a 50 weight % solution in Solvesso 150 ®, cyclohexanone, or a mixture thereof is in general at 23° C. between 80 and 1,000 mPa.sec, preferably between 100 and 300 mPa.sec.

The polyacrylate resins are produced by the known polymerization process or, more particularly, by a process in which acrylic monomers and peroxide initiator are added continuously over the course of their reaction, as is described for example in U.S. Pat. No. 4,442,145.

Particulars of the olefinically unsaturated monomers to be used and of the initiators, solvents and other auxiliaries to be used can also be found in the publication cited above.

The polyesters are polyester polyols known per se, for example based on (i) aliphatic, aromatic or cycloaliphatic dicarboxylic acids of anhydrides of such acids and (ii) polyhydric aliphatic alcohols.

Suitable dicarboxylic acids are, for example, those having a molecular weight in the range from 146 to 250, such as adipic acid, phthalic acid, tetrahydrophthalic acid or hexahydrophthalic acid or mixtures of such acids. Instead of the last three acids mentioned by way of example, it is preferred to use their anhydrides.

Suitable polyhydric alcohols are, in particular, those having a molecular weight in the range from 62 to 150, such as ethylene glycol, propylene glycol, butane-1,4-diol, hexane-1,6-diol, glycerol, trimethylol propane or mixtures of such polyhydric alcohols.

The polyester polyols are prepared by methods known per se using an excess of polyhydric alcohol corresponding to the previously mentioned hydroxyl group content.

The suspensions ready for application are generally prepared by slowly stirring the final enamel powder, a suspension aid such as, for example, magnesium silicate hydrate and also wetting agents and air release agents and other additives into the binder, for example using methoxypropyl acetate or butyl acetate as solvent. Different viscosities (efflux times according to DIN 53 211 (using a DIN-cup having a 4 mm opening) between 20 and 100 seconds) are established according to the required layer thickness and the method of application used.

The suspensions ready for application are preferably prepared as follows. First, the acid-functional polyacrylic polymer is optionally heated to about 65° C. To this polymer is slowly added under stirring a suspension aid (i.e. M-P-A-60 X ®, NL Industries, Inc.), which also is optionally preheated prior to addition to about 65° C., and is stirred until the suspension aid is thoroughly dispersed in the acid-functional polyacrylate. The finely-milled enamel powder is then added, together with high-boiling solvents such as Solvesso 150 ®, cyclohexanone, glycol etheresters, or similar, wetting agents, air release agents, and further additives, to the acid-functional polyacrylate modified with the suspension aid. This mixture is then ground, for example using a ball, pearl, or sand mill, until a satisfactory dispersion of the enamel powder is achieved. After this mixture is separated from the grinding medium (balls, pearls, or sand) and cooled, the corresponding amount of epoxy-functional polyacrylic polymer is added. Different viscosities (efflux times according to DIN 53 211 (using a DIN-cup having a 4 mm opening) between 40 and 200 seconds) are established according to the required layer thickness and the method of application used.

The enamel polymer suspensions are preferably applied by the roll coater method. In cases where one layer is applied as an enamel polymer suspension before shaping and another enamel layer is applied after shaping by methods known per se, any typical methods may be used to apply the other enamel layer.

In one preferred embodiment, the enamel polymer suspension may even be applied by screen printing.

In the interests of rapid curing, a UV-curing medium is particularly advantageous as the binder.

In another embodiment, the enamel polymer suspensions may be applied by the curtain coating process.

In one preferred variant, one or more polymer suspensions are continuously applied in succession to coils.

In another preferred variant, the enamel polymer suspensions may also be successively applied to plane blanks (precut sheets).

Firing is preferably carried out in a continuous furnace in which the polymer or polymer mixture is completely driven out in the preheating zone at temperatures of 200° to 500° C. and the waste gases escaping are treated in the interests of emission control.

The enamels used in the process according to the invention typically have the following composition:

The enamel for the first layer on the metal preferably contains:

| | |
|---|---|
| $SiO_2$ | 40–51% by weight |
| $Al_2O_3$ | 1–5% by weight |
| $B_2O_3$ | 11–18% by weight |
| $K_2O$ | 0–5% by weight |
| CaO | 2–13% by weight |
| $Na_2O$ | 7–15% by weight |
| $Li_2O$ | 0–6% by weight |
| BaO | 0–15% by weight |
| $ZrO_2$ | 0–6% by weight |
| CoO | 0.5–1.5% by weight |
| MnO | 0–2% by weight |
| CuO | 0–3% by weight |
| NiO | 1–4% by weight |
| $P_2O_5$ | 0–3% by weight |
| $F_2$ | 0–5% by weight. |

The enamel for the second layer preferably contains:

| | |
|---|---|
| $SiO_2$ | 35–45% by weight |
| $Al_2O_3$ | 0–4% by weight |
| $B_2O_3$ | 14–20% by weight |
| $Na_2O$ | 7–11% by weight |
| $K_2O$ | 2–9% by weight |
| $Li_2O$ | 0–2% by weight |
| $TiO_2$ | 13–22% by weight |
| MgO | 0–2% by weight |
| $P_2O_5$ | 0–4% by weight |
| ZnO | 0–2% by weight |
| $F_2$ | 0–5% by weight. |

In the process according to the invention, the metal plate need not be pretreated, but rather merely degreased. The expensive and ecologically suspect pretreatment with acidic solutions is thus no longer necessary. In addition, the metal plate may be enamelled before shaping without the enamelled workplace showing poorer properties than the normally obtainable workpiece. Application of the enamel before shaping eliminates the need for complicated methods of application to already shaped workpieces.

After curing of the layer, the organically bound base enamel layer with its organic component of up to 30% may be coated without intermediate firing with a likewise organically bound surface enamel layer with an organic component of up to 30% and, after shaping, the two enamel layers may be fired together to form a firmly adhering, defect-free enamel coating, the organic components being completely driven out.

In some cases, it may be more favorable to apply only one organically bound base enamel layer to the metal plate and, after shaping, to apply the surface layer by typical methods, for example by electrostatic powder coating. In this case, firing takes place at the temperature corresponding to the enamel used, for example at 820° C.

In one special embodiment, the base enamel polymer suspension may also be applied by screen printing to pre-cut sheet, a UV-drying medium affording particular advantages in terms of a short drying time and, hence, a high production rate. This particular version may also be used with advantage for coil coating.

The process according to the invention is preferably carried out, for example, by coating a nonpretreated or merely degreased steel plate with an enamel polymer suspension (forming the base enamel layer), for example by the roll coater method, and, after brief drying (0.5 to 2 mins. at T=20°–180° C.), applying another enamel polymer suspension (forming the surface enamel layer) and briefly drying the suspension thus applied. In this state, the steel plate can be transported and stored as coil or plate bar. The correspondingly treated plates may then be shaped into the desired workpieces and subjected to firing, for example in a continuous furnace.

The enamel polymer suspensions may be applied to coil or pre-cut sheet in known manner by the roll coater method, by the curtain coating method, by spraying or by screen printing.

The invention is illustrated by the following Examples.

EXAMPLE 1

| | |
|---|---|
| $SiO_2$ | 44.8% by weight |
| $Al_2O_3$ | 3.8% by weight |
| $B_2O_3$ | 16.5% by weight |
| CaO | 11.8% by weight |
| $Na_2O$ | 14.1% by weight |
| $K_2O$ | 0.1% by weight |
| CoO | 0.5% by weight |
| CuO | 0.2% by weight |
| NiO | 0.9% by weight |
| $P_2O_5$ | 0.6% by weight |
| MnO | 1.5% by weight |
| $F_2$ | 5.2% by weight | is dry-ground in a ball mill in the absence of further additives so finely that a particle fineness of 2–3 is obtained in the test (Pöschmann's method; Email und Emailliertechnik, page 146) with a 40 μm mesh sieve (16,900 meshes/cm²).

The powder thus obtained is slowly stirred (stirring time approx. 10 mins.) into a mixture containing a binder of A) 15.8% by weight hydroxyethyl methacrylate
   68.0% by weight methyl methacrylate
   13.8% by weight 2-ethylhexyl acrylate
   1.0% by weight acrylic acid
   1.4% by weight catalyst (di-t-butyl peroxide)

and

B) 22.2% by weight trimethylolpropane
   3.2% by weight phthalic anhydride
   60.7% by weight adipic acid
   31.9% by weight 1,2-propylene glycol
   −18.0% by weight water in a mixing ratio and A:B of 80:20 and also methoxypropylacetate as solvent, a suspension aid (Bentone 34 ®), a wetting agent (EFKA66 ®) and an air release agent EFKA21 ® (products of Efka Chem. B.V.) that a mixing ratio of 17.1% by weight binder
16.1% by weight methoxypropylacetate
1.0% by weight Bentone 34 ®
63.3% by weight base enamel powder
1.5% by weight EFKA 66 ®
1.0% by weight EFKA 21 ® is formed.

The resulting suspension has an efflux time of approx. 80 seconds (as measured in accordance with DIN 53 211) and can be applied to degreased and decarburized steel sheets (C<0.005%) by the roll coater method. At this viscosity, a 100 g/m² enamel coating is obtained. After drying for about 1 minute at room temperature, the similarly prepared white enamel suspension can be applied to the base layer and subsequently dried.

To produce the white enamel suspension, a white enamel having the following composition:

| | |
|---|---|
| $SiO_2$ | 43.9% by weight |
| $Al_2O_3$ | 0.1% by weight |
| $B_2O_3$ | 18.0% by weight |
| $Na_2O$ | 7.6% by weight |
| $K_2O$ | 6.6% by weight |
| $Ti_2O$ | 17.2% by weight |
| $P_2O_5$ | 2.8% by weight |
| ZnO | 1.4% by weight |
| $F_2$ | 2.4% by weight | is dry ground in the absence of further additives (particle fineness 2 on a sieve having 16,900 meshes/cm²).

The powder is stirred into a mixture of 17.5% by weight binder (see binder for base enamel suspension)
15.1% by weight methoxypropyl acetate
1.5% by weight Bentone 34 ®
63.4% by weight white enamel powder
1.5% by weight EFKA 66 ®
1.0% by weight EFKA 21 ®

The efflux time according to DIN 53 211 is approx. 80 seconds and the white enamel layer is applied in a quantity corresponding to 300 g enamel/m².

After drying of the second layer applied by the roll coater method, the steel sheet is shaped by deep drawing and is subsequently fired in a standard continuous furnace. The workpieces are transported through the furnace by a chain conveyor, temperatures of approx. 200° C., approx. 300° C., approx. 400° C. approx. 600° C. and approx. 820° C. being reached after 2 minutes, 4 minutes, 5 minutes, 6 minutes and 8 minutes, respectively. The firing temperature of 820° C. is maintained for about 3.5 minutes. After passing through the firing cycle, the workpieces are cooled at a rate similar to the rate which they had been heated. A defect-free white enamel coating is obtained.

The organic components are evaporated off over period of 5 minutes between room temperature and 400° C., removed under suction and subsequently incinerated.

EXAMPLE 2

The base enamel (same composition as in Example 1) is ground in the same way as in Example 1, stirred into the same binder mixture and then applied to steel sheet (quality ED4 according to DIN 16233) and dried. The steel sheet is then shaped. After shaping, the white enamel (composition as in Example 1) is applied by wet spraying of an aqueous suspension containing

| | |
|---|---|
| white enamel | 100.0 parts by weight |
| blue clay | 3.0 parts by weight |
| bentonite | 0.2 part by weight |
| sodium aluminate | 0.4 part by weight |
| potassium carbonate | 0.4 part by weight |
| water | 45.0 parts by weight | dried (3 mins. at 100 ® C.) and then continuously fired as in Example 1. A defect-free white enamel coating is obtained.

EXAMPLE 3

The procedure is as in Example 2, except that the white enamel (composition as in Example 2) is ground in known manner in the presence of 0.3% by weight methyl hydrogen polysiloxane to form an electrostatically sprayable powder and is electrostatically applied to the shaped coated steel sheet (see Example 2). Firing (without intermediate drying) takes place in the same way as in Example 2. A defect-free white enamel coating is obtained.

EXAMPLE 4

A base enamel powder as described in Example 1 is used.

This powder is then ground in a mixture containing a binder consisting of

A) 65.0% by weight 2-ethylhexyl methacrylate
18.0% by weight 2-ethylhexyl acrylate
9.0% by weight methacrylic acid
2.0% by weight catalyst (di-t-butyl peroxide)

and

B) 53.0% by weight 2-ethylhexyl methacrylate
18.0% by weight 2-ethylhexyl acrylate
27.0% by weight glycidyl methacrylate
2.0% by weight catalyst (di-t-butyl peroxide)

in a mixing ratio (A:B) of 81:697 as well as Solvesso 150 ® and cyclohexanone as solvents, a suspension aid (M-P-A 60 X ®), and an air release agent (Fluorad FC 430, Minnesota Mining and Manufacturing, Inc.) by the above described procedure so that a composition of 14.0% by weight binder
56.2% by weight base enamel powder
5.8% by weight suspension aid M-P-A 60 X ®
0.1% by weight air release agent Fluorad FC$^4$30 ®
7.0% by weight cyclohexanone
16.9% by weight Solvesso 150 ® is obtained.

The resulting suspension has an efflux time of approx. 96 sec (as measured in accordance with DIN 53 211) and can be applied to degreased and decarburized steel sheets (C<0.005%) by the roll coater method. At this viscosity, a 100 g/m² enamel coating is obtained. After drying at 350° C. for approx. 30 sec and subsequent cooling in water, the sheet can then be directly topcoated with a similarly prepared suspension of white enamel.

For the manufacture of the white enamel suspension, the same white enamel powder as described in Example 1 is used.

The powder is added as described above to a mixture consisting of binders, solvents, suspension aids, and air release agents so that a composition of 14.0% by weight binder (see binder for base enamel suspension in this example)
56.2% by weight white enamel powder
5.8% by weight suspension aid H-P-A 60 X ®
0.1% by weight air release agent Fluorad FC 430 ®
7.0% by weight cyclohexanone
16.9% by weight Solvesso 150 ® is obtained.

The efflux time according to DIN 53 211 is approx. 92 seconds, and the white enamel layer is applied in a quantity corresponding to 300 g enamel/m². The white enamel suspension is applied by roll coater to steel sheets having a base enamel layer. The sheets so coated with the white enamel layer are then dried at 350° C. for about 30 seconds, then cooled with water.

After drying of the second layer applied by the roll coater method, the steel sheet is shaped by deep drawing and is subsequently fired in a standard continuous furnace. The workpieces are transported through the furnace by a chain conveyor, temperatures of approx. 200° C., approx. 300° C., approx. 400° C., approx. 600° C. and approx. 820° C. being reached after 2 minutes, 4 minutes, 5 minutes, 6 minutes and 8 minutes respectively. The firing temperature of 820° C. is maintained for about 3.5 minutes. After passing through the firing cycle, the workpieces are cooled at a rate similar to the rate at which they had been heated. A defect-free white enamel coating is obtained.

The organic components are evaporated off over a period of 5 minutes between room temperature and 400° C., removed under suction and subsequently incinerated.

What is claimed is:

1. A process for the production of shaped workpieces of metal sheet enamelled with two layers, wherein one or both of said layers have been applied prior to shaping of the workpiece, comprising: 1) coating the sheet, before shaping, with at least one enamel polymer suspension, wherein the polymer suspension comprises a mixture of thermosetting binder system, solvent and a suspension aid, said thermosetting binder system comprises at least one acid-functional polymer and at least one epoxy-functional polymer, said acid-functional and epoxy-functional polymers are nitrogen- and halogen-free and burn at temperatures of 200 to 500 degrees C. and wherein the acid-functional polymer has a content of acid-functional groups between 0.5 and 30 weight % and the epoxy-functional polymer has a content of epoxy-functional groups between 0.5 and 30 weight %; 2) drying the coated sheet; 3) mechanically shaping the dried coated sheet thereby producing shaped sheet workpieces. 4) coating the shaped sheet workpieces with an enamel frit, if only one layer has been applied prior to shaping; and 5) firing the workpieces; thus obtained at temperatures of 560° to 850° C.

2. The process as claimed in claim 1, wherein said two layers are formed by applying one enamel polymer suspension before shaping of the sheet and applying another enamel frit after shaping.

3. The process as claimed in claim 1, wherein the polymer suspension additionally contains conventional additives.

4. The process as claimed in claim 1, wherein the binder comprises a UV-curing medium.

5. The process as claimed in claim 1, wherein the enamel polymer suspension is applied by screen printing.

6. The process as claimed in claim 1, wherein the enamel polymer suspension is applied by curtain coating.

7. The process as claimed in claim 1, wherein the enamel polymer suspension is applied by roll coaters.

8. The process as claimed in claim 1, wherein the enamel polymer suspension is continuously applied to coils.

9. The process as claimed in claim 1, wherein the enamel polymer suspension is applied to blanks.

10. The process of claim 1, wherein firing is carried out in a continuous furnace having a preheating zone, the preheating zone having a temperature of 200° to 500° C.

11. The process as claimed in claim 1, wherein said two layers are formed by successively applying two enamel polymer suspensions to the sheet before shaping.

12. The process of claim 11, wherein the second layer is applied as an enamel polymer suspension.

13. The process as claimed in claim 1, wherein the acid functional and epoxy functional polymers are polyacrylic polymers.

14. The process as claimed in claim 13, wherein the acid-group content of the acid-functional polyacrylic polymer is from 1 to 20 weight % and the epoxy-group content of the epoxy-functional polyacrylic polymer is from 1 to 15 weight %.

* * * * *